United States Patent

Pollman

[15] 3,697,200
[45] Oct. 10, 1972

[54] HYDRAULIC SERVO DEVICE
[72] Inventor: Frederic W. Pollman, Rockford, Ill.
[73] Assignee: Sundstrand Corporation
[22] Filed: July 7, 1969
[21] Appl. No.: 839,381

[52] U.S. Cl. .................................. 418/61, 418/191
[51] Int. Cl. .............................................. F01c 1/08
[58] Field of Search ......... 91/56, 92, 375; 103/126 B; 230/158; 192/61; 60/52 S; 418/61, 191; 180/79.2

[56] References Cited

UNITED STATES PATENTS

| | | | |
|---|---|---|---|
| 3,348,493 | 10/1967 | Easton | 418/61 |
| 2,015,143 | 9/1935 | Holmes | 192/61 |
| 2,240,874 | 5/1941 | Thomas et al. | 91/92 X |
| 2,311,237 | 2/1943 | Loveday | 192/61 |
| 2,899,937 | 8/1959 | Nuebling | 91/375 X |
| 2,965,075 | 12/1960 | Payne et al. | 91/56 |
| 2,969,043 | 1/1961 | Friesen | 91/375 X |
| 3,131,602 | 5/1964 | Ford | 91/375 X |
| 3,151,526 | 10/1964 | Van Hoene | 103/126 B |
| 3,185,439 | 5/1965 | Inaba et al. | 91/375 |
| 3,198,126 | 8/1965 | Minich | 103/126 B |
| 3,401,602 | 9/1968 | Birdwell | 91/56 |

*Primary Examiner*—Martin P. Schwadron
*Assistant Examiner*—Irwin C. Cohen
*Attorney*—Hofgren, Wegner, Allen, Stellman & McCord

[57] ABSTRACT

A hydraulic servo motor having a rotary valve for supplying fluid to a rotary servo motor that follows movement of the valve about the same axis driving a concentrically disposed output shaft, with the servo motor taking the form of a stationary internally toothed ring gear, a carrier drivingly connected to the output shaft supporting a plurality of planetary gears interengaging the stationary ring gear and defining therewith a plurality of expanding and contracting fluid chambers, there being provided a pressure balancing recess for the rotary valve member to hydraulically balance the same as well as coplanar ports in the rotary valve member of circular configuration to provide gradual and controlled communication between the main supply and return ports and adjacent ports in the carrier member communicating with the expanding and contracting gear tooth spaces.

4 Claims, 10 Drawing Figures

PATENTED OCT 10 1972
3,697,200
SHEET 1 OF 3
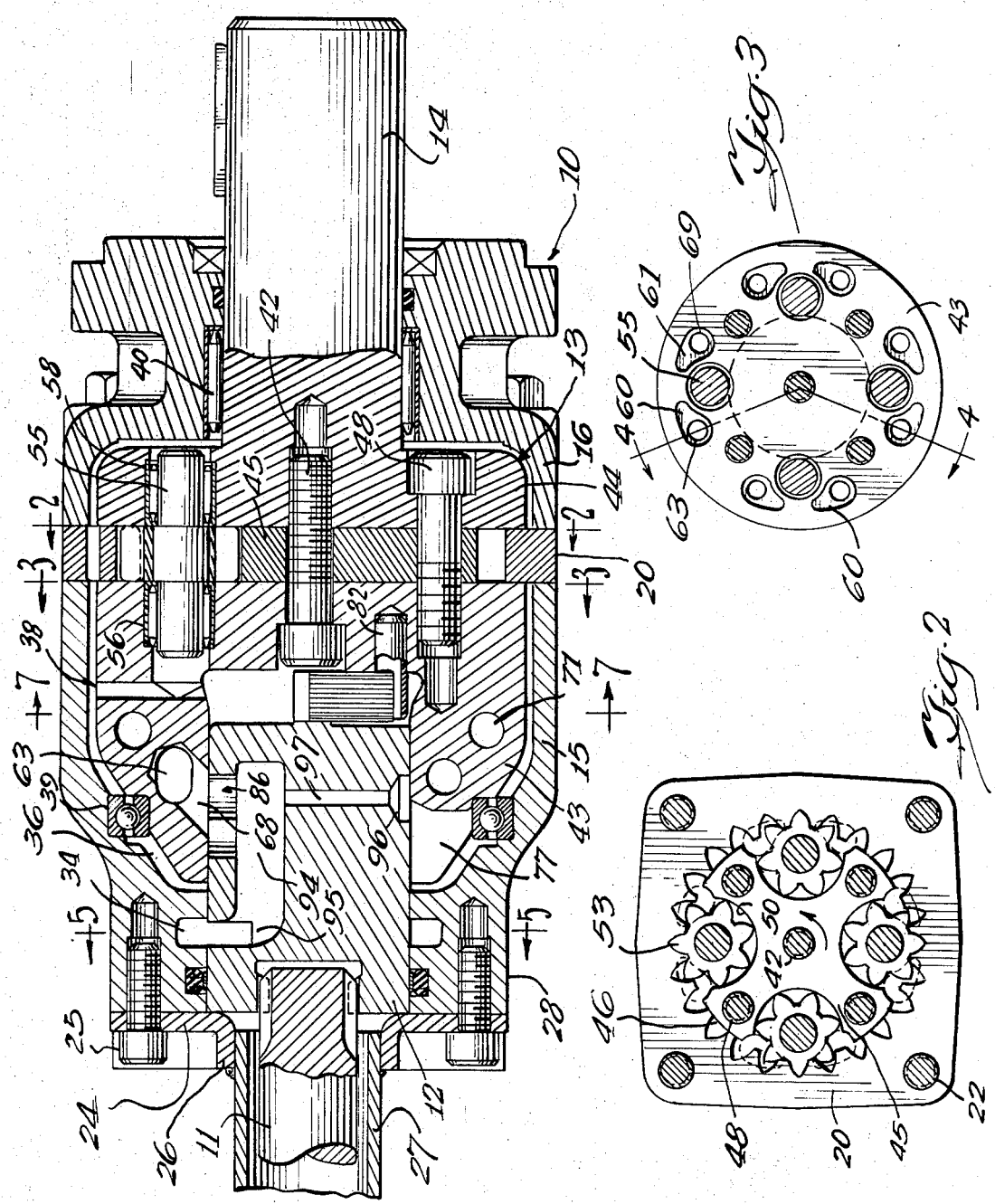
INVENTOR
Frederic W. Pollman
BY Hofgren, Wegner, Allen, Stellman & McCord
ATTORNEYS

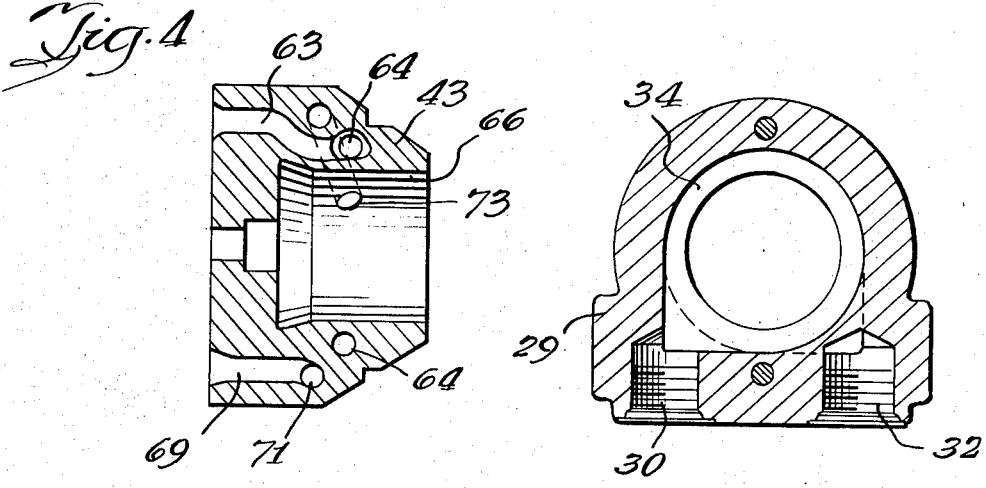
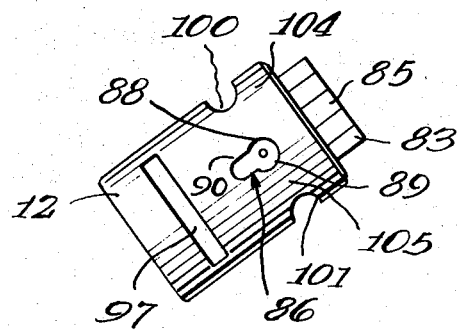
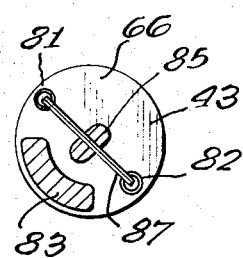
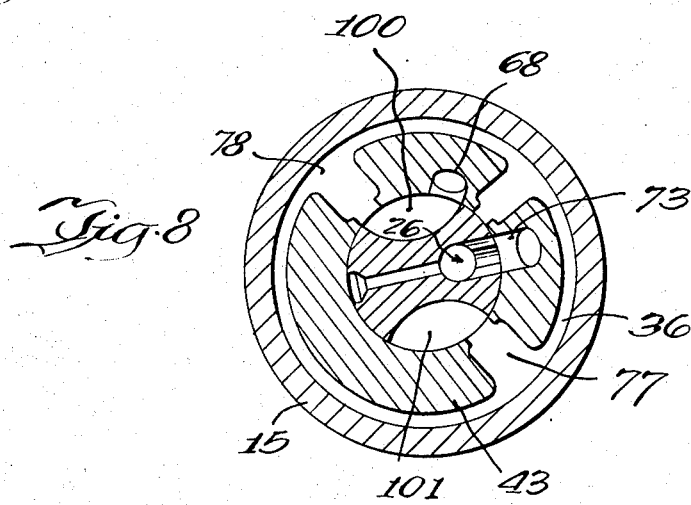

HYDRAULIC SERVO DEVICE

BACKGROUND OF THE PRESENT INVENTION

The present invention relates to a low speed, high torque rotary servo mechanism that has utility in many areas, one of which is in power steering systems.

One prior arrangement of this general type includes a rotary servo valve mounted adjacent an internally toothed stationary member and an orbiting inner rotor externally toothed forming expanding and contracting tooth spaces with the internally toothed member. The orbital movement of the inner gear requires that each of the chambers be both high and low pressure chambers during the rotation of the servo device, the output shaft being connected to the orbiting gear member. In order to accommodate this change of state in each of the fluid chambers, a commutating arrangement is required in the servo valve. In order to achieve this a plurality of elongated slots are provided in the periphery of the valve, with alternate ones of the valves being axially spaced from the other so that a commutating effect may be achieved with stationary ports which communicate with the main fluid motor chambers and are peripherally disposed about the commutating slots.

Moreover, in many of these prior constructions axial movement is required between the servo valve and the valve bore.

It is the object of the present invention to provide a servo motor of this general character that provides greater controlled valving action, one that does not require axial movement of the valve member, one that does not require elongated slots in the rotary valving member, one in which the valving member is hydraulically balanced within the associated valve bore, and one in which the requirement for valve commutation is eliminated entirely.

SUMMARY OF THE PRESENT INVENTION

In accordance with the present invention a rotary hydraulic servo motor is provided with a coaxial rotary servo valve and rotary servo motor in which the rotary valve is considerably simplified by eliminating the requirement for valve commutation and in which the servo valve is hydraulically balanced within the associated valve bore.

The servo motor according to the present invention takes the form of a stationary ring gear with a main carrier mounted for rotation within the ring gear and having a plurality of rotatable planet gears rotatably mounted within the carrier spaced from the central axis thereof and engaging teeth on the ring gear. The tooth spaces between the planet gears and the ring gears define the expanding and contracting fluid chambers that when pressurized effect rotation of an output shaft directly and drivingly connected concentrically with the carrier itself. For the purpose of supplying fluid to and from the expanding and contracting tooth spaces a servo valve is rotatably mounted within an annular valve bore extending centrally within the carrier itself. A port is provided in the valve bore which communicates through a gallery arrangement with one of the ports associated with each of the planet gears. A second port is provided in the valve bore communicating through a gallery arrangement in the carrier with the other ports associated with each of the planetary gears. Since the ports associated with the expanding tooth chambers, for a given direction of rotation, remain stationary with respect to the carrier member only two ports are necessary in the valve bore and only a single supply port is required in the rotary valve itself.

Disposed diametrically opposite the supply port in the rotary servo valve is a pressure balancing recess which communicates with the supply port and effects a pressure balancing of the rotary servo valve within the main valve bore. Means are provided to permit only limited movement between the rotary servo valve and the carrier or rotor to assure proper follow-up action of the servo motor and output shaft with respect to the servo valve which is rotated through a suitable manual operator.

BRIEF DESCRIPTION OF THE DRAWINGS

FIG. 1 is a longitudinal section of a servo motor according to the present invention;

FIG. 2 is a section taken generally along line 2—2 of FIG. 1 showing the planet gears and ring gear in relationship with their associated ports, FIG. 3 is a sectional view taken generally along line 3—3 of FIG. 1 showing the porting surface on the carrier member adjacent the planetary gears;

FIG. 4 is a subassembly section of part of the carrier member taken generally along line 4—4 of FIG. 3;

FIG. 5 is a cross section taken generally along line 5—5 of FIG. 1 illustrating the main inlet and outlet ports in the housing;

FIG. 6 is a subassembly view of the main servo valve;

FIG. 7 is a sectional view of the servo valve taken generally along line 7—7 of FIG. 1, FIG. 8 is a sectional view of the present servo valve mechanism;

DETAILED DESCRIPTION OF THE PREFERRED EMBODIMENTS

Figure 9:
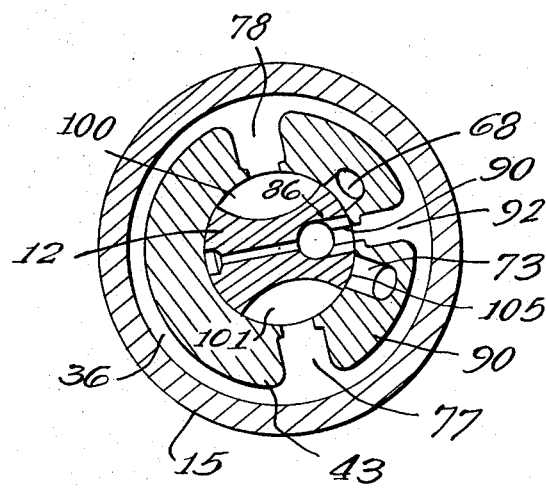
FIG. 9 is a cross sectional view of the servo mechanism shown in FIG. 8 in its follow-up position.

As best seen in FIG. 1, the present hydraulic servo motor 10 is seen to consist generally of a manually rotatable input shaft 11, a rotatable servo valve 12 driven thereby, a rotary hydraulic motor 13, and an output shaft 14 driven directly by the servo motor.

Generally opposed rectangular housing members 15 and 16 are provided which sandwich a stationary internally toothed ring gear 20 shown also in FIG. 2. The housing members 15 and 16 as well as ring gear 20 are fastened together by suitable fasteners 22 shown in FIG. 2. Closing the left end of the housing member 15 is an annular end plate 24 fixed to the housing member by suitable fasteners 25 and having an axial flange 26 fixed to a sleeve 27 surrounding the manually operable input shaft 11.

Housing member 15 has disposed on the reduced portion 28 thereof a boss 29 having an inlet port 30 and an outlet port 32 as shown in FIG. 5 therein. Port 30 communicates directly with an annular recess 34 shown in both FIGS. 1 and 5 which is the main high pressure supply for the servo device 10. Port 32 communicates directly with the interior 36 of the housing so that fluid is expelled through the housing by porting it from the motor 13 to the interior of the casing.

The servo motor 13 consists of a generally annular gear carrier 38 rotatably supported in the housing members 15 and 16 by bearings 39 and 40, respectively; bearing 40 rotatably supporting shaft 14 which is fixed to the carrier assembly by a suitable central threaded fastener 42.

The carrier assembly 38 includes a left end cap member 43 and a right end cap member 44 formed integrally with shaft 14. Disposed between the end members 43 and 44 is a spacer 45 also shown in FIG. 2. The end members 43 and 44 and the spacer 45 are fixed for rotation together as a unit by suitable threaded fasteners 48.

The spacer 45 has four arcuate recesses 50 in the periphery thereof spaced ninety degrees apart which define pockets between the end members 43 and 44 which receive planet gears 53, there being provided four planet gears 53 within the present hydraulic servo motor, although a greater or lesser number of planets may be provided. Plate 45 also has convex arcuate surfaces 46 which have a close sealing clearance with the tips of the internal gear 20.

Each of the planet gears 53 has teeth interengaging the ring gear 20 and each is rotatably supported in the carrier assembly 38 by a shaft 55 which is rotatably supported at one end in end cap 43 by bearing 56 and at the other end in end portion 44 by bearing 58. The gears 53 have a width slightly less than the width of spacer 45 to provide a running clearance for the gears 53 within the associated pockets within the gear carrier assembly.

As the gears 53 rotate in engagement with the ring gear, the interengaging teeth define expanding and contracting fluid chambers and the present device operates by porting fluid to the expanding fluid chambers causing rotation of the gears 53 driving the gear carrier 38 and the output shaft 14 in rotation.

For the purpose of porting fluid to and from the expanding and contracting tooth spaces defined by the interengaging gears 53 and 20, the end member 43 of the carrier assembly is provided with two kidney shaped ports 60 and 61 associated with each of the gears 53. The spacer 45 and the gears 53 seal ports 60 from ports 61 so that either may act as a high or a low pressure port and thus the present device is reversible and the output shaft 14 may be rotated in either direction of rotation. As shown in FIG. 4, the ports 60 are connected together through axial passages 63 in end member 43 which communicate with a semiannular gallery passage 64. Annular passage 64 communicates with a valve bore 66 defined centrally in end member 43 through a single port 68 as shown in FIG. 1.

Similarly, the ports 61 communicate with each other through axial passages 69 in end member 43 and an annular gallery passage 71. Gallery passage 71 communicates with the valve bore 66 through a diagonal passage 73 shown in FIG. 4. Actually, the port 73 is angularly disposed from its location shown in FIG. 4 and is illustrated there for the purpose of clarity. The relative location of ports 68 and 73 may be more clearly seen in FIGS. 8 and 9.

For the purpose of connecting each of the ports 68 and 73 with the interior of the housing and outlet port 32, the left portion of the end member 43 as seen in FIGS. 1, 8 and 9 has two diametrically opposed slots 77 and 78.

The servo valve 12 performs the function of supplying fluid to one of the ports 68 and 73 and returning fluid from the other of the ports until the carrier assembly 38 passes through a given angle of movement following the movement of valve 12 and continues the rotation until the valve 12 is stopped at which time the carrier assembly 38 and output shaft 14 will cease rotation when a neutral position has been achieved between the carrier assembly 38 and control valve 12.

The control valve 12 is generally cylindrical in construction as shown in FIGS. 6, 7, 8 and 9, and it is rotatably mounted within valve bore 66 in end member 43.

As shown in FIG. 7, means are provided for permitting approximately 45° of rotation between the valve member 12 and the carrier 38 in either direction from the neutral position of the elements shown in FIG. 7. More specifically, the end of the valve bore 66 has diametrically opposed axial pins 81 and 82 which will be engaged by an arcuate projection 83 extending from the end of the valve 12 and positioned to interfere with the pins 81 and 82 upon rotation of the valve member 12. In the neutral position shown in FIG. 7 it is apparent that the projection 83 along with the valve member 12 may be rotated in either direction of rotation somewhat less than 45° before engaging the stops 81 and 82. Further movement of the control valve 12 in that direction will cause the manual driving of the carrier 38 and the output shaft 14. Thus, if there is a hydraulic failure in the system, the output shaft 14 may be manually driven by the input shaft 11 in either direction of rotation.

For the purpose of resiliently urging the control valve 12 to a neutral position with respect to the carrier assembly 38 and the ports 68 and 73, a central projection 85 extends from the end of the control valve 12. Through this projection extends a spring 87 as shown in FIG. 7 which is fixed to the pins 81 and 82 at its ends. Spring 87 does not prevent relative movement between the control valve 12 and the carrier assembly 38 but urges the elements to their relative rotational neutral position shown in FIGS. 7 and 9. In the neutral position, both ports 68 and 73 are blocked by the lands of control valve 12 stopping rotation of the carrier 38 and output shaft 14.

A keyhole shaped high pressure supply port 86 is provided in the valve member 12 having circular porting portions 88 and 89. An axially extending portion 90 is provided on supply port 86 for the purpose of providing freer communication with an open center slot 92, shown in FIG. 9 in the end member 43 which is similar in configuration to the return slots 77 and 78.

For the purpose of supplying high pressure fluid to the high pressure port 68 an axially extending passage 94 is provided within the valve member 12. Passage 94 has a radially extending portion 95 which communicates with a peripheral slot 97 shown in FIG. 6 which in turn is in continuous communication with the high pressure inlet recess 34 in housing member 15.

The control valve 12 is pressure balanced in the valve bore 66 by a balancing recess 96 diametrically opposed from the high pressure port 86. Recess 96 is equal in area to the port 86 and is supplied high pressure fluid through a radially extending passage 97 which communicates with high pressure passage 94 as shown in FIG. 1. Thus, equal and opposite hydraulic reactions are imposed on the control valve 12 within the bore 66 hydraulically balancing the valve member 12.

Figure 10:
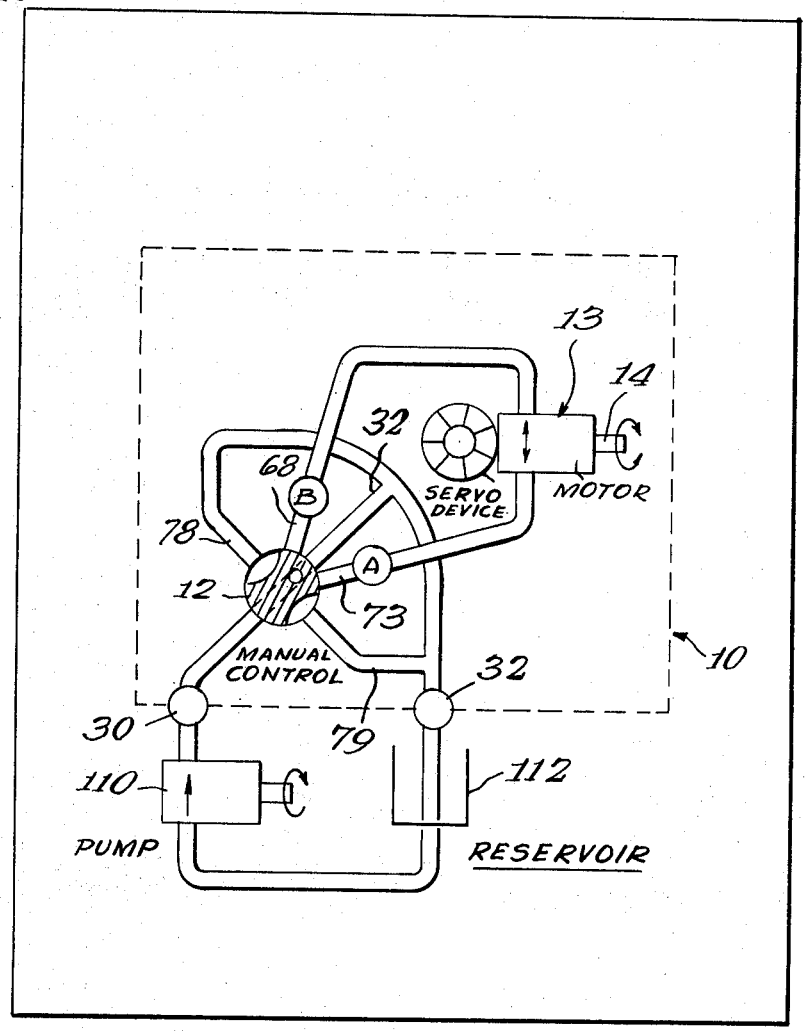
FIG. 10 is a schematic illustration of the present servo mechanism in a hydraulic circuit.

As seen in FIGS. 6, 8 and 9, return slots 100 and 101 are provided in the sides of the control valve 12 diametrically opposed with each being 90° away from the supply port 86. The recesses 100 and 101 are of sufficient length to connect the ports 68 and 73 with the discharge ports 78 and 77, respectively, as shown in FIG. 8. Lands 104 and 105 on the periphery of the valve member 12 are defined between the ports 100 and 101 and the main supply port 86, and these lands are of sufficient length to block ports 68 and 73 when the valve member 12 is in its neutral position shown in FIG. 9. While the operation of the present servo device 10 is believed apparent from the above description, the following operation of the device described in conjunction with the hydraulic circuit shown FIG. 10 will serve as a summary of the present invention. As shown in FIG. 10, a pump 110 is provided which supplies fluid under pressure to the main housing inlet port 30. Fluid discharged from the device through port 32 is returned to a reservoir 112.

With no input rotation being applied to shaft 11, the spring 87 positions the servo valve 12 in its neutral position shown in FIG. 9 connecting the main supply port 86 with the return slot 92. Slot 92 communicates with the interior of the housing so that the valve is in what may be termed an open center state with the pump 110 delivering fluid through the control valve 12 into the interior of the housing and out discharge port 32 to the reservoir 112. Alternatively, return slot 92 may be eliminated to provide a closed center valve so the pump outlet is blocked when the valve 12 is in the neutral position.

The servo motor 13 is prevented from rotating since both ports 68 and 73 are blocked by the lands on the valve 12, thus preventing the output shaft 14 from rotating. Since the valve 12 does not respond to slight rotation of the output shaft 14 when the valve is in its neutral position, it is termed a non-load reaction valve. It should be understood that a load reaction valve could also be incorporated by providing small connecting passages between port 68 and slot 100, and between port 73 and slot 101.

To initiate a right turn, the operator shaft is turned in a clockwise direction, rotating the valve 12 to the position shown in FIG. 8. This angle of rotation is insufficient to engage the projection 83 with the stop 81 shown in FIG. 7. Fluid under pressure from port 86 is delivered through port 73 to the port 61 associated with each of the gears 53. This causes the clockwise rotation of gears 53 as viewed in FIG. 2 driving the carrier assembly 38 in a counterclockwise direction as viewed in FIG. 2. This results in a right-hand or clockwise rotation of the output shaft 14 when viewed from the input shaft side of the hydraulic unit 10 in FIG. 1. As the output shaft 14 rotates in this right-hand direction, the carrier 38 including end plate 43 rotates toward the position shown in FIG. 9. Fluid is discharged from the motor 13 through the ports 60 which are adjacent the contracting fluid chambers defined by the teeth on gears 53 and 20. Fluid in ports 60 discharges through passages 63 and port 68 which communicates with the interior of the casing through recess 100 and slot 78 in the carrier end member 43. Fluid within the casing discharges through main port 32. When the output shaft is turned sufficiently so that port 73 ceases communication with supply port 86 and port 68 ceases communication with recess 100, fluid flow relative to the motor 13 will cease and output shaft 14 will stop.

Left turning rotation of output shaft 14 is produced in a reverse manner by rotating the input shaft 11 in a left-hand or counterclockwise direction when viewed from the input shaft porting high pressure fluid to the port 68 and returning fluid from port 73.

Because the ports 68, 73 and 86 are substantially circular in configuration flow to and from the hydraulic motor 13 can be precisely regulated which permits more accurate positioning of the control motor as well as minimizing abrupt movements of the hydraulic actuator and consequent hydraulic shock loads. the contracting

I claim:

1. A hydraulic servo device, comprising: a relatively stationary internally toothed outer gear member, a carrier rotatable about an axis, a plurality of planet gears rotatably supported on said carrier having axes spaced from the axis of said carrier, said planet gears having external teeth interengaging the internal teeth on said outer gear and defining therewith high and low pressure expanding and contracting tooth spaces upon relative rotation of said gears, first port means in said carrier continuously communicating with all of the expanding tooth spaces, second port means in said carrier continuously communicating with all of the contracting tooth spaces, and movable servo valve means adjacent said carrier having a supply port and a return port means selectively connectable to said first and second port means arranged so that as the servo valve means ports fluid to one of said carrier ports the carrier will follow movement of the servo valve, said carrier having a centrally disposed bore therein, said bore having a first port opening communicating with said first port means, and a second port opening communicating with said second port means, said servo valve means including a cylindrical member rotatably supported for limited rotating movement in said bore, said supply port means and said return port means being selectively communicable with said first and second openings, said first and second openings being coplanar in a plane perpendicular to the axis of said servo valve means, said supply port means and said return port means being coplanar in said plane.

2. A hydraulic servo device, comprising; a relatively stationary internally toothed output gear member, a carrier rotatable about an axis, a plurality of planet gears rotatably supported on said carrier having axes spaced from the axis of the carrier, said planet gears having external teeth interengaging the internal teeth on the outer gear and defining therewith expanding and contracting tooth spaces upon relative rotation of said gears, first port means in said carrier continuously communicating with one of said spaces, second port means in said carrier continuously communicating with the other of said spaces, a servo valve member rotatably mounted in said carrier having a supply port and a return port selectively connectable to said first and second port means, said supply port including a diametral passage, in said servo valve member for balancing said servo valve member in said carrier having opposite ends opening to the carrier, said first and second port means and said supply port being spaced so that as the servo valve means ports fluid to one of said carrier ports the carrier will follow movement of the servo valve, one end of said diametral passage having a balancing recess at the periphery of the servo valve member, said supply passage having a port diametrically opposite said balancing recess substantially the same area as the recess to pressure balance the valve member within said carrier.

3. A hydraulic servo device, comprising; a relatively stationary internally toothed outer gear member, a carrier rotatable about an axis, a plurality of planet gears rotatably supported on said carrier having axes spaced from the axis of the carrier, said planet gears having external teeth interengaging the internal teeth on the outer gear and defining therewith expanding and contacting tooth spaces upon relative rotation of said gears, first port means in said carrier continuously communicating with one of said spaces, second port means in said carrier continuously communicating with the other of said spaces, a servo valve member rotatably mounted in said carrier having a supply port and a return port selectively connectable to said first and second port means, said first port means, said second port means and said supply port having generally a circular configuration to provide gradual communication therebetween, said first port means, said second port means and said supply port being spaced so that as the servo valve means ports fluid to one of said carrier ports the carrier will follow movement of the servo valve member, said first port means, said second port means and said supply port being coplanar in a plane perpendicular to the axis of said servo valve member.

4. A hydraulic servo device as defined in claim 3, including housing means for said device, a first main port in said housing means adapted to be connected to a source of supply fluid under pressure, a second main port in said housing communicating with the interior of said housing and adapted to be a return port, an annular recess in said valve bore and communicating with said first port means, axial passage means in said valve member communicating said annular recess with said supply port means, radially extending return port means in said valve bore communicating directly with the interior of the housing, return recesses in said valve member for communicating said first and second port means with said radially extending return port means, and means for limiting the relative rotational movement between said valve member and said valve bore to assure proper followup action of said valve bore.

* * * * *